United States Patent
Lipo et al.

(10) Patent No.: US 9,595,858 B2
(45) Date of Patent: Mar. 14, 2017

(54) DOUBLE AIR GAP, SPOKE TYPE VERNIER MACHINE

(71) Applicant: Wisconsin Alumni Research Foundation, Madison, WI (US)

(72) Inventors: Thomas A. Lipo, Middleton, WI (US); Byungtaek Kim, Gunsan (KR)

(73) Assignee: Wisconsin Alumni Research Foundation, Madison, WI (US)

(*) Notice: Subject to any disclaimer, the term of this patent is extended or adjusted under 35 U.S.C. 154(b) by 617 days.

(21) Appl. No.: 14/021,543

(22) Filed: Sep. 9, 2013

(65) Prior Publication Data
US 2015/0069875 A1   Mar. 12, 2015

(51) Int. Cl.
*H02K 1/14* (2006.01)
*H02K 21/12* (2006.01)
*H02K 1/27* (2006.01)

(52) U.S. Cl.
CPC ........... *H02K 21/12* (2013.01); *H02K 1/2793* (2013.01); *H02K 2213/03* (2013.01)

(58) Field of Classification Search
CPC .............................. H02K 1/2793; H02K 21/12
IPC ........................................... H02K 1/2793,21/12
See application file for complete search history.

(56) References Cited

U.S. PATENT DOCUMENTS 4,517,478 A * 5/1985 Oudet ................. H02K 37/125
                                                          310/268
7,723,888 B2 * 5/2010 Petek ..................... H02K 16/04
                                                          310/112

OTHER PUBLICATIONS

Qu et al., Relationship between Magnetic Gears and Vernier Machines, 2011 International Conference on Electrical Machines and Systems (ICEMS), Beijing, Aug. 20-23, 2011, pp. 1-6.
(Continued)

*Primary Examiner* — Dang Le
(74) *Attorney, Agent, or Firm* — Bell & Manning, LLC (57) ABSTRACT

A vernier machine includes a rotor, permanent magnets mounted as spokes in pole pairs within the rotor, a first stator, a second stator, a first stator winding wound about the first stator to form a number of poles between a first set of terminals, and a second stator winding wound about the second stator to form the number of poles between a second set of terminals. The first stator and the second stator each include slots and teeth. The first stator and the second stator are mounted on opposite sides of the rotor with each separated by an air gap. The teeth of the first stator are offset from the teeth of the second stator by a half slot pitch relative to the rotor. A number of the pole pairs of the rotor is greater than the number of poles of the first stator winding.

14 Claims, 12 Drawing Sheets

(56) References Cited

OTHER PUBLICATIONS

Toba et al., Generic Torque-Maximizing Design Methodology of Permanent Magnet Vernier Machine, 1999, IEEE, pp. 522-524.
Toba et al., Novel Dual-Excitation Permanent Magnet Vernier Machine, 1999.
J. Li, Design, analysis and control of permanent-magnet vernier machines, 2012, pp. 1-177.
Kakihata et al., Design of Surface Permanent Magnet-type Vernier Motor, 2012 15th International Conference on Electrical Machines and Systems (ICEMS), Sapporo, Oct. 21-24, 2012, pp. 1-6.
Zhao et al., Magnet Flux Focusing Design of Double Stator Permanent Magnet Vernier Machine, Compumag 2013, Budapest, Hungary, Jun. 30, 2013.
Boughrara et al., Analytical Calculation of Parallel Double Excitation and Spoke-Type Permanent-Magnet Motors; Simplified Versus Exact Model, Progress in Electromagnetics Research B, vol. 47, 2013, pp. 145-178.

\* cited by examiner

DOUBLE AIR GAP, SPOKE TYPE VERNIER MACHINE

BACKGROUND

An increase in the cost of neodymium and dysprosium ore has substantially increased the cost of permanent magnet machines. As a result, manufacturers have been searching for topologies that provide good torque density with ferrite magnets. Thus far, however, the design of such machines has resulted in relatively bulky machines because ferrite magnet machines produce flux densities on the order of one-third that of rare earth magnet machines. One relatively new machine, however, which has great potential for low speed applications is the vernier permanent magnet machine.

SUMMARY

In an example embodiment, a vernier machine is provided. The vernier machine includes, but is not limited to, a rotor, a plurality of permanent magnets mounted as spokes in pole pairs within the rotor, a first stator, a second stator, a first stator winding, and a second stator winding. The first stator includes, but is not limited to, a first plurality of slots and a first plurality of teeth. A slot of the first plurality of slots is positioned between a pair of the first plurality of teeth. The first stator is mounted on a first side of the rotor separated by a first air gap between the rotor and a tooth of the first plurality of teeth. The second stator includes, but is not limited to, a second plurality of slots and a second plurality of teeth. A slot of the second plurality of slots is positioned between a pair of the second plurality of teeth. The second stator is mounted on a second side of the rotor separated by a second air gap between the rotor and a tooth of the second plurality of teeth. The second side is opposite the first side. The first stator winding is wound about the first stator to form a number of poles between a first set of terminals. The second stator winding is wound about the second stator to form the number of poles between a second set of terminals. The first plurality of teeth is offset from the second plurality of teeth by a half slot pitch relative to the rotor. A number of the pole pairs of the rotor is greater than the number of poles of the first stator winding.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A permanent magnet (PM) vernier machine (PMVM) is an electromechanical device wherein the number of rotor magnetic poles pairs, $Z_r$, is much greater than the number of stator winding magnetic pole pairs, p, rather than equal to the number of stator winding pole pairs as in a conventional PM machine. Though the number of stator and rotor poles is unequal, the machine achieves smooth torque by synchronizing the space harmonics of the stator magneto-motive force (MMF) with the MMF of the rotor magnets.

The increase in torque over a conventional PM machine results because two components of torque are produced in a vernier machine rather than one component as in a conventional machine. The first component is the normal synchronous reaction torque produced by the magnets and the fundamental component of the stator MMF in which the MMF rotates at synchronous speed defined by the pole pitch of the stator winding. An additional component is produced by the reluctance torque produced by the magnets and the fundamental slot harmonic component of MMF in which this MMF component rotates at a higher synchronous speed than that defined by the coil pitch of the stator winding. As understood by a person of skill in the art, the PMVM may be used as a generator or as a motor.

Figure 1:
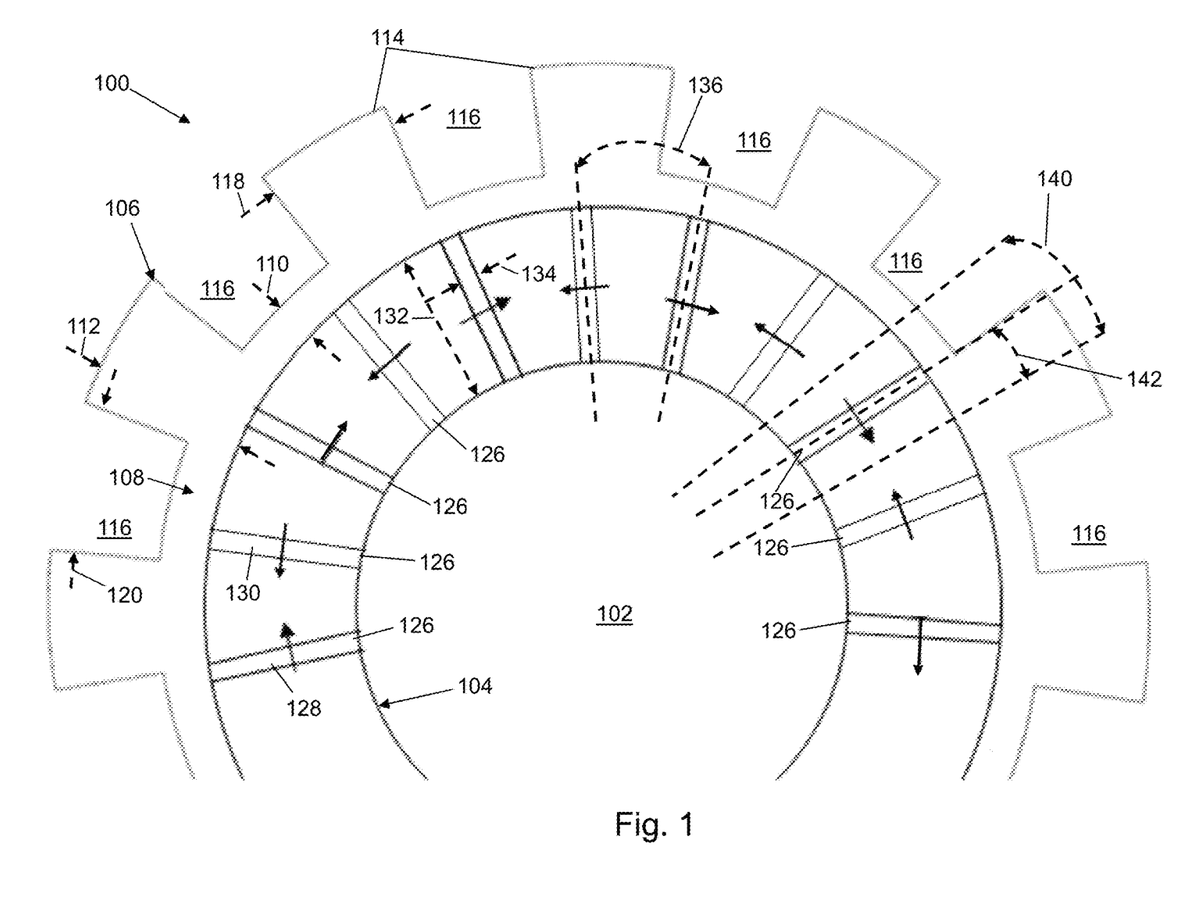
FIG. 1 depicts a portion of a spoke permanent magnet vernier machine with a stator and a rotor positioned radially adjacent to each other in accordance with an illustrative embodiment.

Referring to FIG. 1, a portion of a spoke type PMVM 100 is shown in accordance with an illustrative embodiment with a rotor core 102, a rotor 104, and a stator 106 positioned radially adjacent to each other. Rotor core 102, rotor 104, and stator 106 have generally circular cross sections as shown with reference to FIG. 1. Rotor 104 is mounted for rotation with rotor core 102. As used in this disclosure, the term "mount" includes join, unite, connect, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact, but are mounted together via intermediate elements). Elements referenced as mounted to each other herein may further be integrally formed together, for example, using a molding process as understood by a person of skill in the art. As a result, elements described herein as being mounted to each other need not be discrete structural elements. The elements may be mounted permanently, removably, or releasably.

Stator 106 may be formed of a ferromagnetic material such as iron, cobalt, nickel, etc. Stator 106 may include a plurality of slots 114 and a plurality of teeth 116. A slot of the plurality of slots 114 is positioned between a pair of the plurality of teeth 116. Each slot of the plurality of slots 114 has a slot width 118. Each tooth of the plurality of teeth 116 has a tooth width 120. The plurality of teeth 116 may be straight-sided or may be angled, for example, radially toward a center of PMVM 100.

Rotor 104 and stator 106 are separated by an air gap 108. Air gap 108 has a varying "height" between rotor 104 and stator 106 due to the changing height between the plurality of slots 114 and the plurality of teeth 116. Air gap 108 has a first height 110 between a surface of rotor 104 and a surface of a tooth of the plurality of teeth 116. Air gap 108 has a second height 112 between a surface of rotor 104 and a surface of a slot of the plurality of slots 114.

Rotor 104 may be formed of a ferromagnetic material such as iron, cobalt, nickel, etc. Rotor 104 may include a plurality of permanent magnets 126 mounted as spokes through rotor 104. The plurality of permanent magnets 126 is electrically isolated from each other. Each permanent magnet of the plurality of permanent magnets 126 is mounted perpendicular to air gap 108 and is magnetized to form a south pole on a first side and a north pole on a second side opposite to the first side. The plurality of permanent magnets 126 are mounted with N poles adjacent N poles and S poles adjacent S poles to form pole pairs. For illustration, a first permanent magnet 128 and a second permanent magnet 130 form a first pole pair with the arrows pointing from the S pole to the N pole. The pole pairs are formed at a regular pitch circumferentially around rotor 104.

The permanent magnets may be formed of rare earth magnets, such as neodymium and dysprosium, of ferrite based magnets, etc. Each permanent magnet of the plurality of permanent magnets 126 has a height 132 and a width 134. Each permanent magnet of the plurality of permanent magnets 126 is separated from the adjacent permanent magnets by an angle 136.

A stator angle 140, θ, is an angle between a reference axis defined at a center of a slot of the plurality of slots 114. A rotor angle 142, $\theta_m$, is an angle of a position of rotor 104 relative to the reference axis.

Windings (not shown) are mounted in the plurality of slots 114 of stator 106 as understood by a person of skill in the art. In an illustrative embodiment, the windings are full pitched. The windings are wound about stator 106 to form a number of poles p between a set of terminals (not shown).

The number of the plurality of slots 114, $Z_s$, equals 6pq where p is the number of poles of the stator winding of stator 106, and q is a number of the plurality of slots 114 per the number of poles of the stator winding per a number of phases provided by an alternating current supplied to the stator winding. For vernier machines, $Z_r - Z_s = \pm p$. Thus, as already discussed, $Z_r$ is greater than p in a vernier machine.

Figure 2:
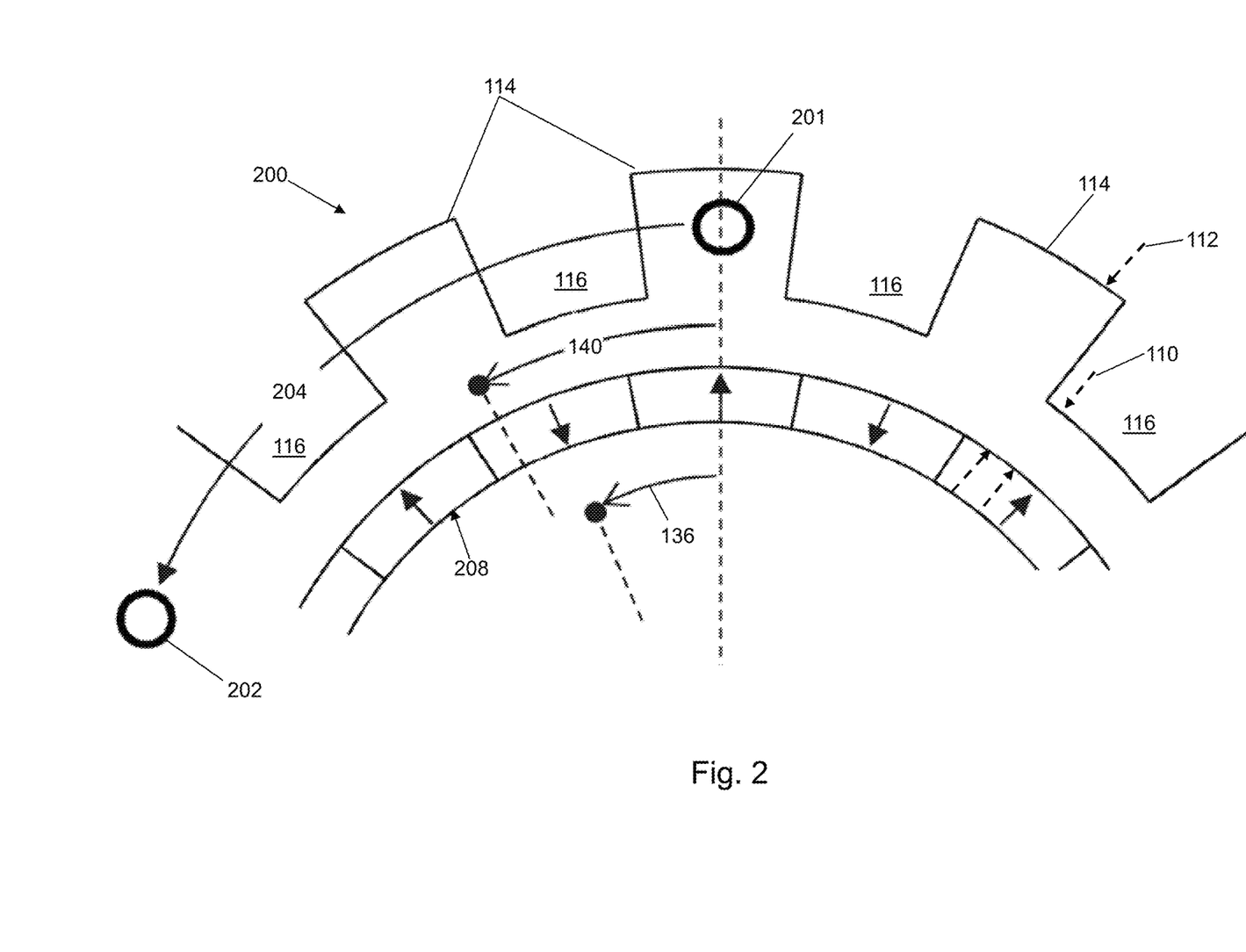
FIG. 2 depicts a portion of a surface permanent magnet vernier machine with a stator and a rotor positioned radially adjacent to each other in accordance with an illustrative embodiment.

Referring to FIG. 2, a portion of a surface type PMVM machine (SPMM) 200 is shown. SPMM 200 may include a plurality of surface mounted permanent magnets 208. SPMM 200 may include a first conductor 201 of a first pole pair and a second conductor 202 of a second pole pair separated by an angle 204 of π/p. The MMF developed by SPMM 200 is defined as $F_{PM}(\theta, \theta_m) \approx F_{PM1} \cos Z_r(\theta - \theta_m)$. The specific air gap permeance P is defined as $P(\theta) \approx P_0 - P_1 \cos(Z_s \theta)$, where $F_{PM1}$, $P_0$, and $P_1$ are determined by the geometries of the stator slots and magnets. The air gap flux density is defined as $$B(\theta, \theta_m) = F_{PM}(\theta, \theta_m) P(\theta) = B_{PM0} \cos Z_r(\theta - \theta_m) - \frac{B_{PM1}}{2}(\cos((Z_r - Z_s)\theta - Z_r \theta_m) + \cos((Z_r + Z_s)\theta - Z_r \theta_m)),$$

where $B_{PM0} = F_{PM1} P_0$ and $B_{PM1} = F_{PM1} P_1$, $F_{PM1}$ is the fundamental component of the MMF, $P_0$ is the fundamental component of the Fourier series of the specific permeance, and $P_1$ is the first harmonic coefficient of the Fourier series of the specific permeance.

For a vernier machine, the back electro-motive force (EMF) is defined as $$e_{ph}(t) = k_{1q} N_{ph} D_g l_{stk} \omega_m \left( B_{PM0} \mp \frac{Z_r}{2p} B_{PM1} \right) \cos(Z_r \theta_m \mp \theta_{ph}),$$

where $k_{1q}$ is the fundamental component of the winding factor, $N_{ph}$ is the number of turns per phase, $D_g$ is the air gap diameter of stator 106, $l_{stk}$ is the stack length of the core, $\omega_m$ is the mechanical speed of rotor 104, $\theta_{ph}$ is the phase angle for each phase winding. When $Z_r - Z_s = +p$, the minus sign is used for $\mp$; when $Z_r - Z_s = -p$, the plus sign is used for $\mp$.

The back-EMF, includes two terms. As understood by a person of skill in the art, the first term is identical to that of a conventional PM machine. As a result, the torque production of a conventional PM machine and the vernier machine based on the fundamental component of magnet MMF is the same. In addition, the net back-EMF of the vernier machine includes an additional term which suggests that the total EMF can be greater than the EMF of the conventional PM machine. It appears that the back-EMF, and thus, motor torque can be theoretically increased without limit since the second term is proportional to the number of pairs of rotor magnets $Z_r$. However, this is ultimately not possible because of the limitation on $B_{PM1}$ which, in turn, depends upon the shape of the slots. In any case, to obtain the benefit of a vernier machine, both terms should clearly be summed in a positive manner and the condition to satisfy this results in $Z_r - Z_s = -p$ as opposed to the positive value of p.

Based on $B_{PM0} = F_{PM1} P_0$, $B_{PM1} = F_{PM1} P_1$, and $$Z_r = 6pq - p, \quad E_{ph} = \frac{k_{1q} N_{ph} D_g l_{stk} \omega_m}{\sqrt{2}} \left( F_{PM1} \left( P_0 + \frac{6q-1}{2} P_1 \right) \right).$$

Replacing the coefficients $F_{PM1}$, $P_0$, and $P_1$, $$E_{ph} = \frac{2\sqrt{2} B_r k_{1q} N_{ph} D_g l_{stk} \omega_m}{\pi \mu_r} \frac{g_m}{g + g_m} (K_{conv} + K_{add}),$$

where $B_r$ is the residual flux density, $g_m$ is the magnet thickness, $\mu_r$ is the recoil permeability of the magnet, g is the air gap length that oscillates between first height 110 and second height 112, $$K_{conv} = 1 - 1.6k_\beta \frac{\pi D_g}{6pqg} c_0^2, \text{ and}$$

$$K_{add} = k_\beta c_0 \frac{\pi D_g}{p(g+g_m)}\left(1 - \frac{1}{6q}\right)\left(\frac{0.78}{0.78 - 2c_0^2}\right)\sin(1.6\pi c_0),$$

where $k_\beta$ is the slope of the function of $\beta$ where $\beta$ is the nonlinear function of $$\frac{\tau}{g + g_m}$$

where $\tau$ is the slot width, and $c_0$ is the ratio of slot width to slot pitch.

Figure 7:
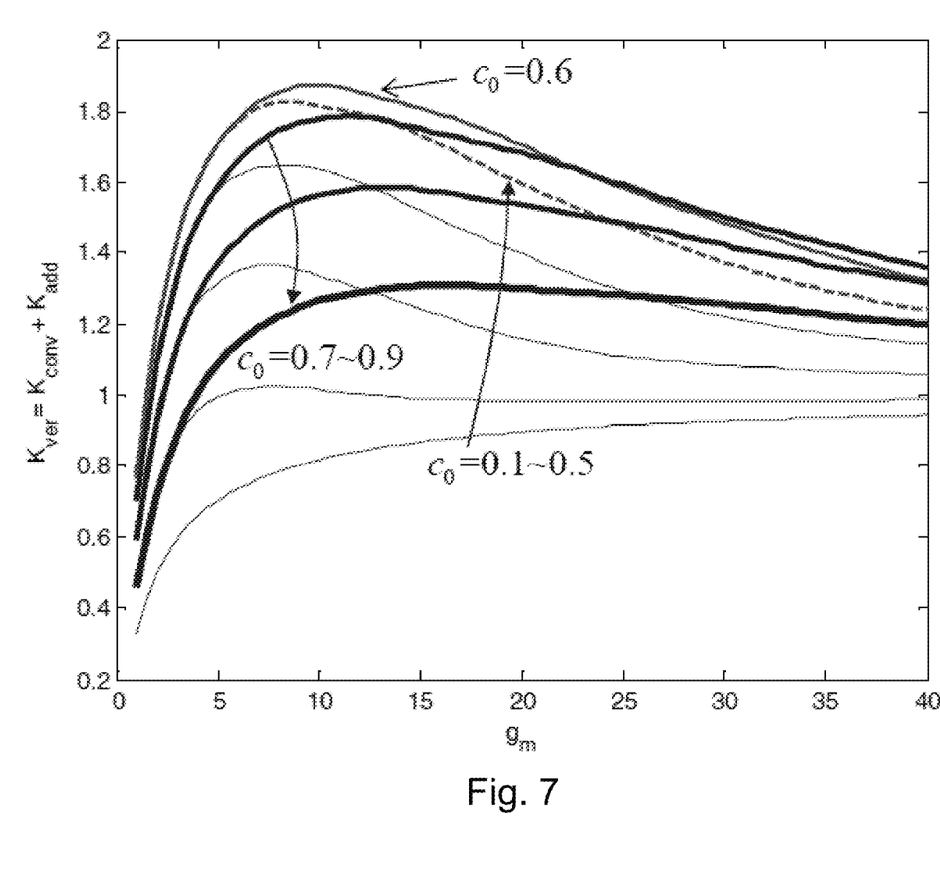
FIG. 7 shows $K_{ver}=K_{conv}+K_{add}$ as a function of $g_m$ in accordance with an illustrative embodiment.
Figure 8:
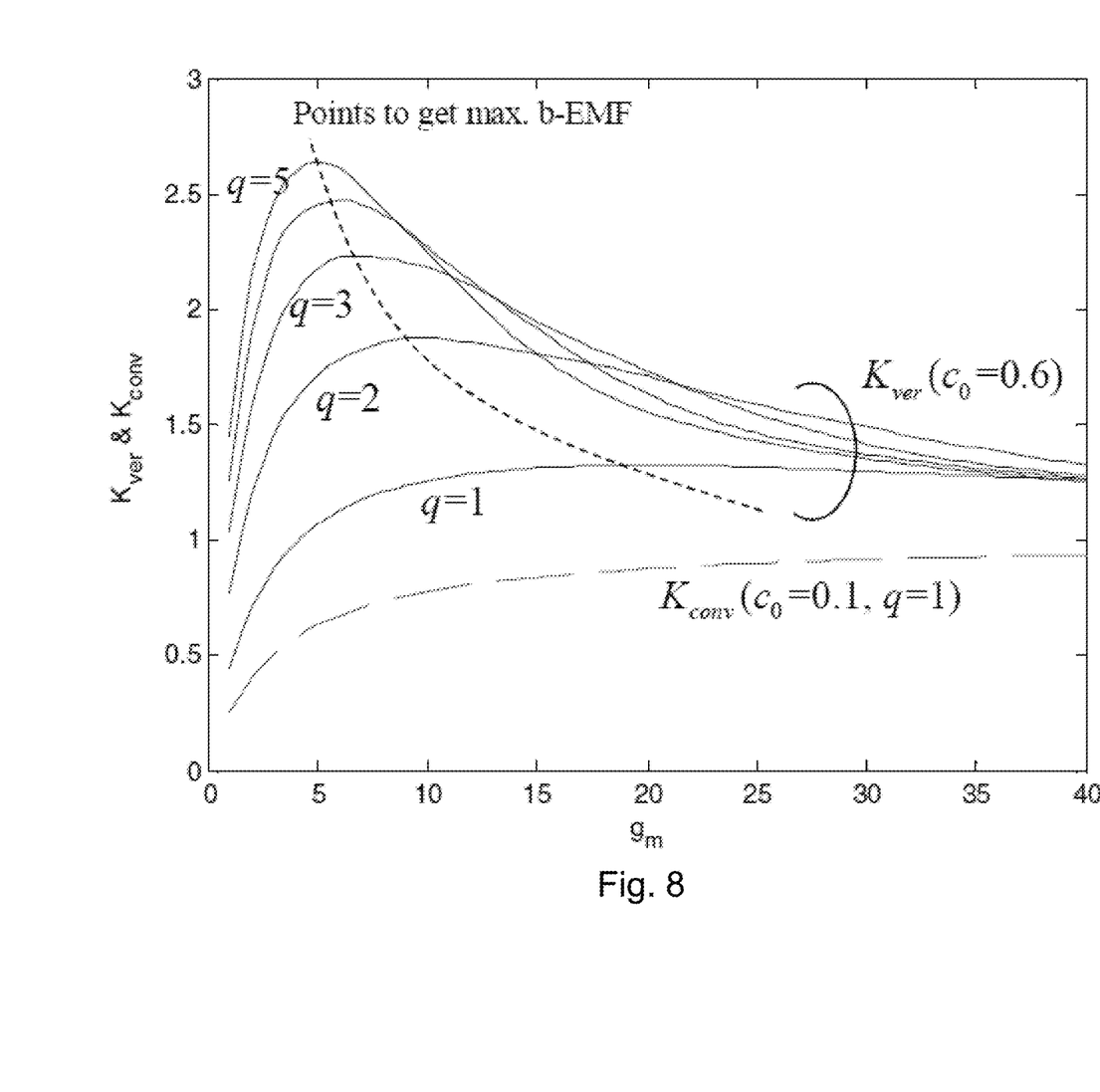
FIG. 8 shows $K_{ver}=K_{conv}+K_{add}$ as a function of $g_m$ for $c_{0=0.6}$ for different values of q in accordance with an illustrative embodiment.

The parameters effecting $K_{add}$ are $c_0$, $$\frac{D_g}{g + g_m},$$

q, and p. As $c_0$ increases, $K_{conv}$ decreases because the effective air gap length increases. As $g_m$ increases, $K_{conv}$ increases. Unlike a conventional machine, $K_{add}$ reaches a maximum at a specific magnet thickness and keeps decreasing even though the magnet thickness increases, because of the decreasing value of $P_1$. For most cases, maximizes with a $c_0=0.5\sim0.6$ as shown with reference to FIG. 7. FIG. 7 shows $K_{ver}=K_{conv}+K_{add}$ as a function of $g_m$. While q increases, which means $Z_r$ increases, $K_{add}$ is not greatly affected, especially when q is greater than 2. Referring to FIG. 8, the variation of $K_{ver}$ with $g_m$ and q is shown. The results show that the maximum value of $K_{ver}$ reaches above 2.5 when q continues to increase.

Since the mechanical power of PM machine is the product of current and back-EMF, and the winding current is normally limited by surface current density $K_s$, the power can be defined as $$P_0 = K_\tau \omega_m V_g \frac{g_m}{g + g_m}(K_{conv} + K_{add}),$$

where $$K_s = \frac{6N_{ph}I_{ph}}{\pi D_g},$$

$I_{ph}$ is the current per phase, $$K_\tau = \frac{4\sqrt{2} B_r k_{1q} K_s}{\pi \mu_r},$$

and $V_g$ is the air gap volume. For a machine with given $c_0$, p and q, and defining them as a constant $k_0$, $$P_0 = K_\tau \omega_m V_g \frac{g_m}{g + g_m}(1 + k0k\beta Dgg + gm.$$

This equation shows the benefit of a vernier machine with respect to the machine's air gap volume necessary for a given power. The first term represents the well-known proportional relation between the air gap volume and power, but due to second term, as the diameter increases with a fixed gap length, the volume for a given power decreases. From this equation, it can be expected that the vernier machine is suitable for a machine with larger diameter.

Figure 9:
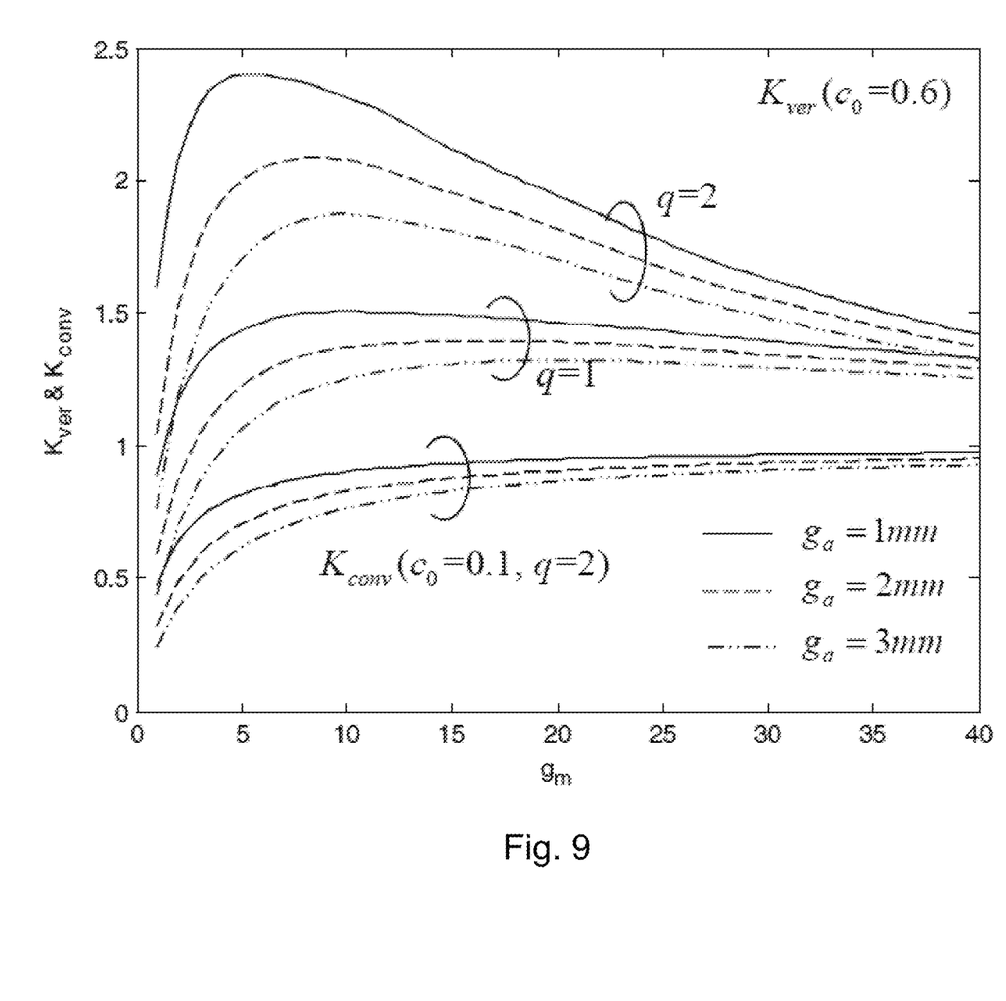
FIG. 9 shows $K_{ver}=K_{conv}+K_{add}$ as a function of $g_m$ for $c_{0=0.6}$ for different values of q and air gap width in accordance with an illustrative embodiment.

The effects of $$\frac{D_g}{g + g_m}$$

were investigated by decreasing g. $K_{ver}$ for various air gap lengths was calculated. From the results shown in FIG. 9, it can be seen that the gap length also increases the maximum back-EMF substantially, almost three times that of the conventional machine, which means that back-EMF or power with the same current is three times that of a conventional motor.

$$\frac{D_g}{g + g_m}$$

is me most effective factor to increase the back-EMF. As $$\frac{D_g}{g + g_m}$$

increases, the back-EMF increases substantially, which also means that use of a thin magnet is better for obtaining a higher back-EMF in a vernier machine contrary to that of a conventional machine.

Figure 10:
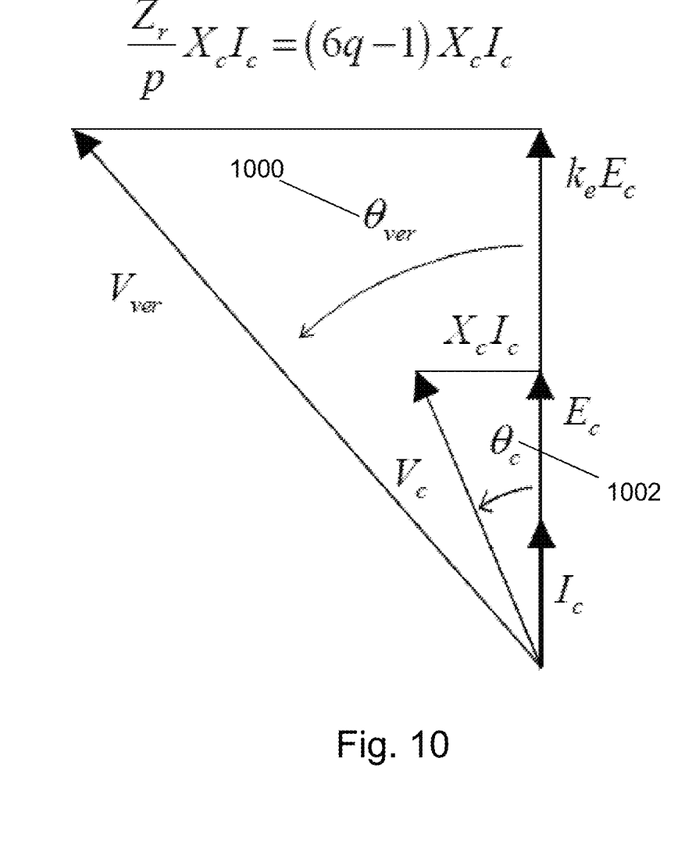
FIG. 10 depicts power factor angles in accordance with an illustrative embodiment.
Figure 11:
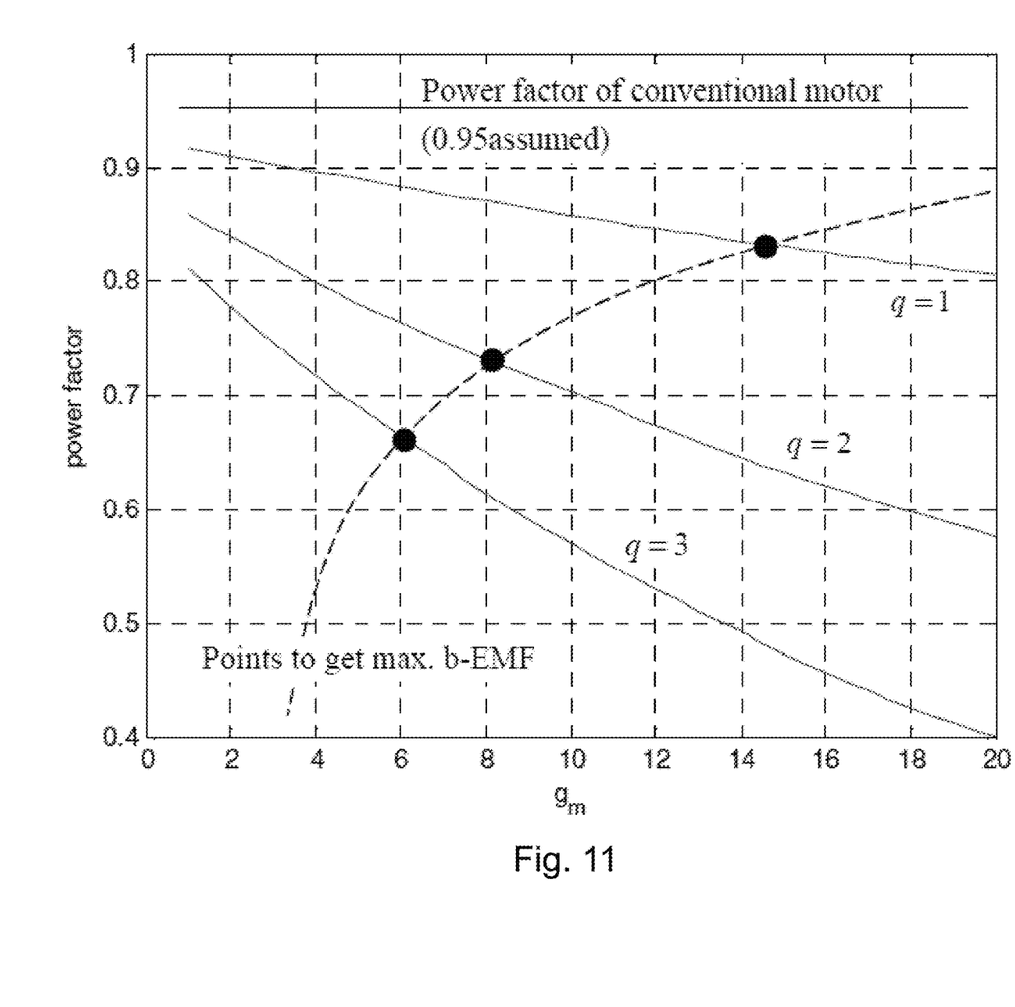
FIG. 11 shows the power factor as a function of $g_m$ for different values of q in accordance with an illustrative embodiment.

The power factor of a vernier machine may be defined as $$\cos\theta_{ver} = 1 \bigg/ \sqrt{1 + \left(\frac{Z_r}{pk_e}\right)^2 \tan^2\theta_c},$$

where $\theta_{ver}$ is a first power angle 1000 and $\theta_c$ is a second power angle 1002 as shown with reference to FIG. 10 and $k_e$ is a coefficient of voltage boost. Referring to FIG. 11, a variation in power factor as a function of $g_m$ and q is shown. The results show that as q increases, the power factor severely decreases. In particular, it is lower than 0.75 when q=2 and $g_m=10$ millimeters though the back-EMF is maximized when q=1. This result indicates that inverter capacity increases substantially. Therefore, to design a SPMM, it is desirable to choose the slots per pole per phase q to be lower 3.

The MMF distribution in air gap 108 can be shown to be $$F_{g,m}(\theta, \theta_m) = -\frac{8V_{mag}}{\pi(4 + R_m)P_{g0}}(1 + K\cos(Z_s\theta))\cos(Z_s(\theta - \theta_m)),$$

-continued $$\text{where } V_{mag} = \frac{B_r g_m}{\mu_m}, R_m = \frac{g_m}{\mu_m h_m}, K = \frac{R_m P_{g1}}{4 + R_m P_{g0}},$$

$\mu_m$ is a permeability of each of the plurality of permanent magnets 126, and $h_m$ is height 132. The potential, $B_{g,m}(\theta, \theta_m) = F_{g,m}(\theta, \theta_m \theta) P_s(\theta)$, oscillates due to the oscillation of g, decreasing the useful air gap flux density. Unlike for SPMM 200, the magnitude of $F_{g,m}(\theta, \theta_m)$ for PMVM 100 oscillates when rotor 104 moves because the rotor core pieces between the plurality of permanent magnets 126 do not have a fixed magnetic potential. When the oscillating MMF meets oscillating g, the flux density $B_{g,m}(\theta, \theta_m)$ is less than expected.

Figure 3:
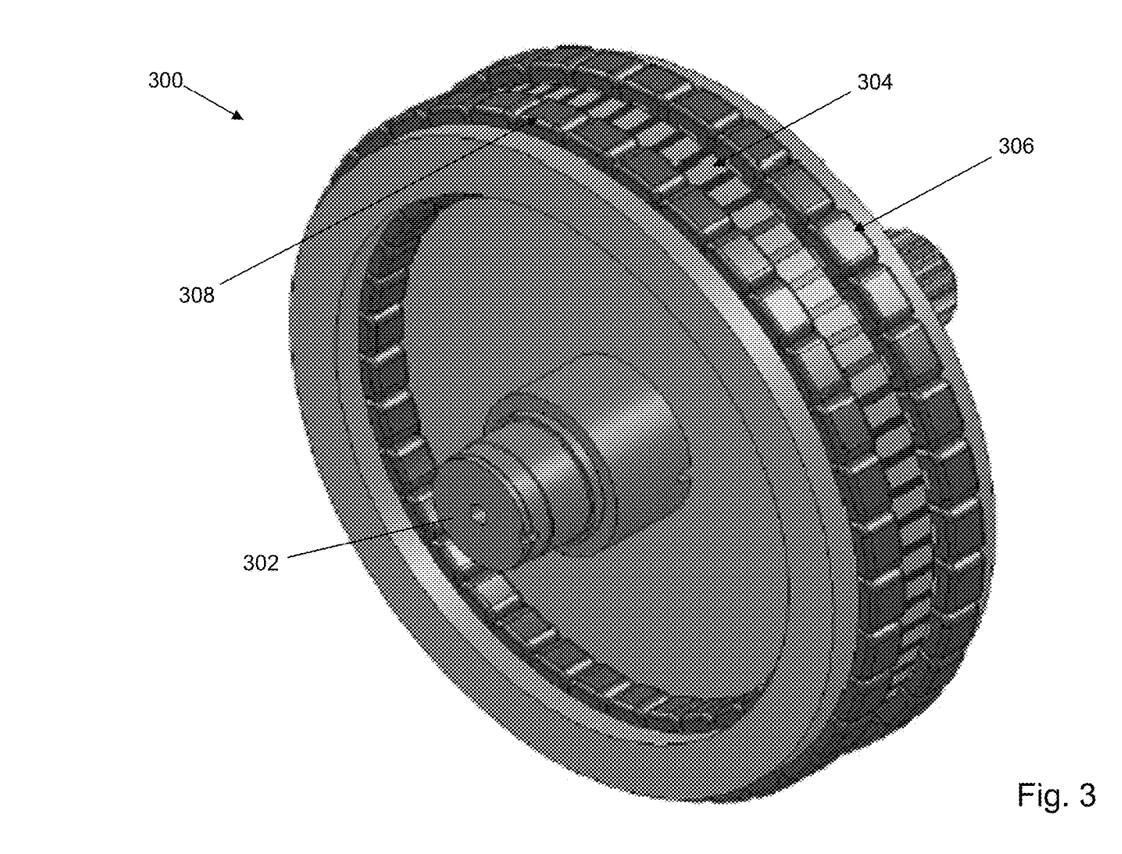
FIG. 3 depicts a double air gap permanent magnet vernier machine with a first stator and a second stator positioned axially on either side of a rotor in accordance with an illustrative embodiment.

Referring to FIG. 3, a double air gap PMVM (DGPMVM) 300 is shown in accordance with an illustrative embodiment. DGPMVM 300 includes a rotor core 302, a rotor 304, a first stator 306, and a second stator 308 positioned axially adjacent to each other. Rotor core 302, rotor 304, first stator 306, and second stator 308 have generally circular cross sections as shown with reference to FIG. 2. Rotor 304 is mounted for rotation with rotor core 302.

Figure 4:
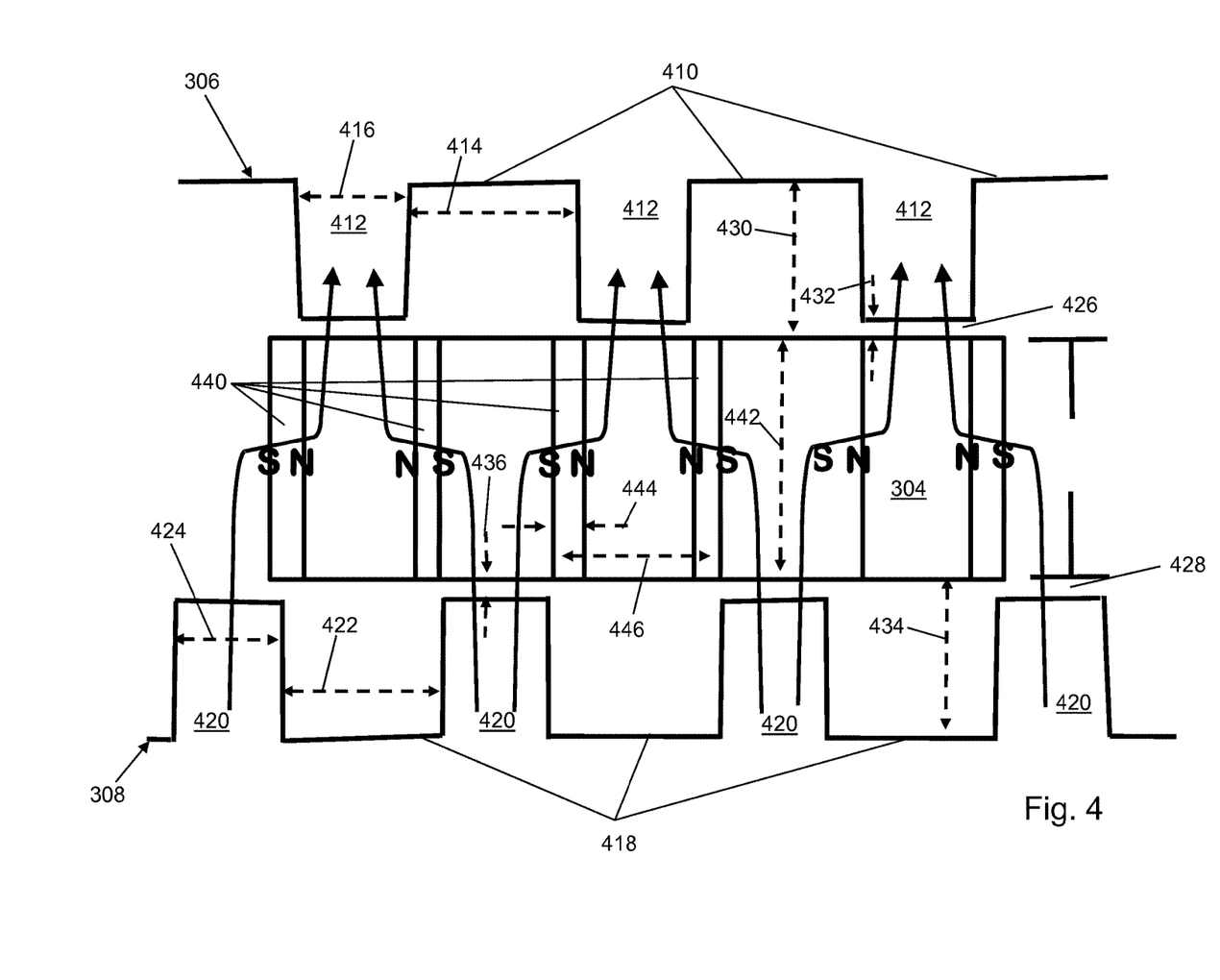
FIG. 4 depicts a portion of the double air gap permanent magnet vernier machine of FIG. 3 straightened out in accordance with an illustrative embodiment.

Referring to FIG. 4, DGPMVM 300 is shown "straightened out" for simplicity. First stator 306 may be formed of a ferromagnetic material such as iron, cobalt, nickel, etc. First stator 306 may include a first plurality of slots 410 and a first plurality of teeth 412. A slot of the first plurality of slots 410 is positioned between a pair of the first plurality of teeth 412. Each slot of the first plurality of slots 410 has a first slot width 414. Each tooth of the first plurality of teeth 412 has a first tooth width 416. The first plurality of teeth 412 may be straight-sided or may be angled, for example, to have a shorter width where the tooth extends from a body of first stator 306.

Second stator 308 may be formed of a ferromagnetic material such as iron, cobalt, nickel, etc. Second stator 308 may include a second plurality of slots 418 and a second plurality of teeth 420. A slot of the second plurality of slots 418 is positioned between a pair of the second plurality of teeth 420. Each slot of the second plurality of slots 418 has a second slot width 422. Each tooth of the second plurality of teeth 420 has a second tooth width 424. The second plurality of teeth 420 may be straight-sided or may be angled, for example, to have a shorter width where the tooth extends from a body of second stator 308.

Rotor 304 and first stator 306 are separated by a first air gap 426, and rotor 304 and second stator 308 are separated by a second air gap 428. First air gap 426 has a varying "height" between rotor 304 and first stator 306 due to the changing height between the first plurality of slots 410 and the first plurality of teeth 412. First air gap 426 has a first height 432 between a surface of rotor 304 and a surface of a tooth of the first plurality of teeth 412. First air gap 426 has a second height 430 between a surface of rotor 304 and a surface of a slot of the first plurality of slots 410.

Second air gap 428 has a varying "height" between rotor 304 and second stator 308 due to the changing height between the second plurality of slots 418 and the second plurality of teeth 420. Second air gap 428 has a first height 436 between a surface of rotor 304 and a surface of a tooth of the second plurality of teeth 420. Second air gap 428 has a second height 434 between a surface of rotor 304 and a surface of a slot of the second plurality of slots 418.

Rotor 304 may be formed of a metallic material such as iron. Rotor 304 may include a plurality of permanent magnets 440 mounted as spokes through rotor 304. The plurality of permanent magnets 440 is electrically isolated from each other. Each permanent magnet of the plurality of permanent magnets 440 is mounted perpendicular to first air gap 426 and to second air gap 428 and is magnetized to form a south pole on a first side and a north pole on a second side opposite to the first side. The plurality of permanent magnets 440 are mounted with N poles adjacent N poles and S poles adjacent S poles to form pole pairs. The pole pairs are formed at a regular pitch circumferentially around rotor 304.

First stator 306 is mounted on a first side of rotor 304 separated by first air gap 426, and second stator 308 is mounted on a second side of rotor 304 separated by second air gap 428. The first plurality of teeth 412 is offset from the second plurality of teeth 420 by the slot pitch $$c_0 = \frac{W_s}{W_s + W_T},$$

where $W_s$ is slot width 414 and $W_T$ is tooth width 416.

The permanent magnets 440 may be formed of rare earth magnets, such as neodymium and dysprosium, of ferrite based magnets, etc. Each permanent magnet of the plurality of permanent magnets 440 has a height 442 and a width 444. Each permanent magnet of the plurality of permanent magnets 440 is separated from the adjacent permanent magnets by a center-center distance 428.

Figure 5:
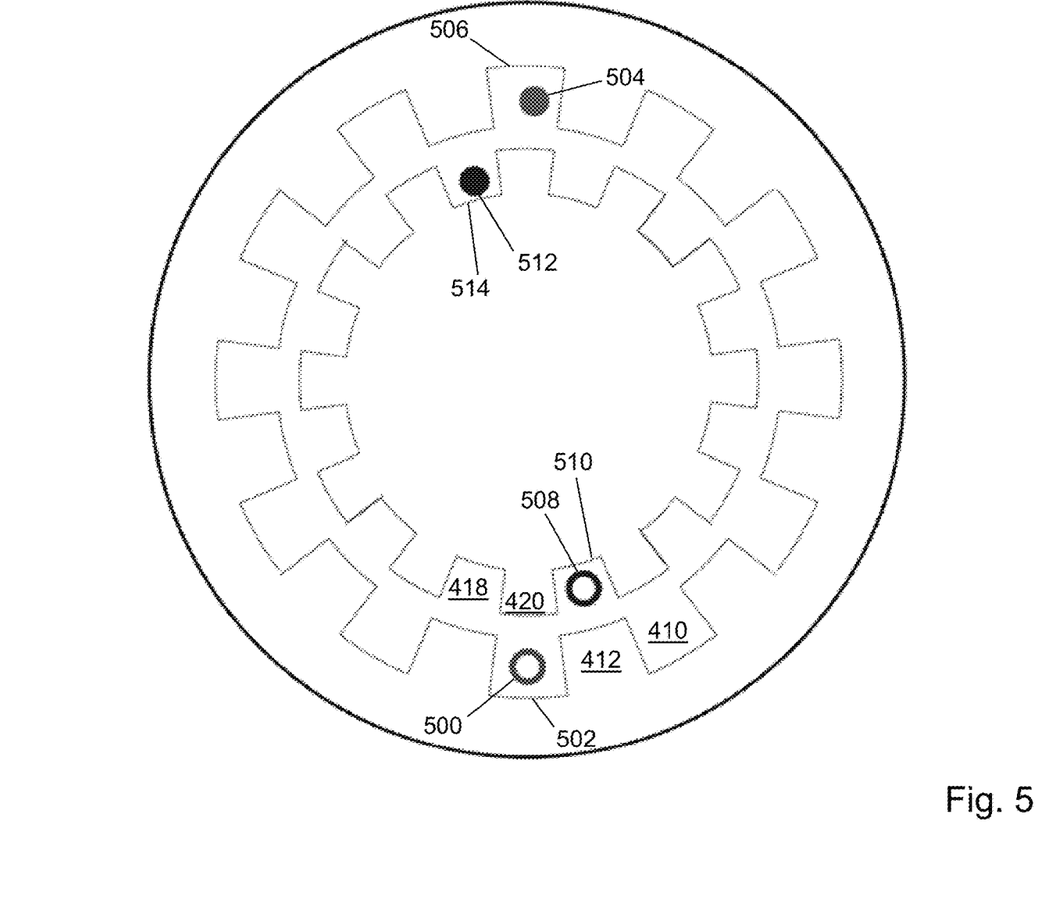
FIG. 5 depicts a portion of a double air gap permanent magnet vernier machine with a first stator and a second stator positioned radially on either side of a rotor with example windings in accordance with an illustrative embodiment.
Figure 12:
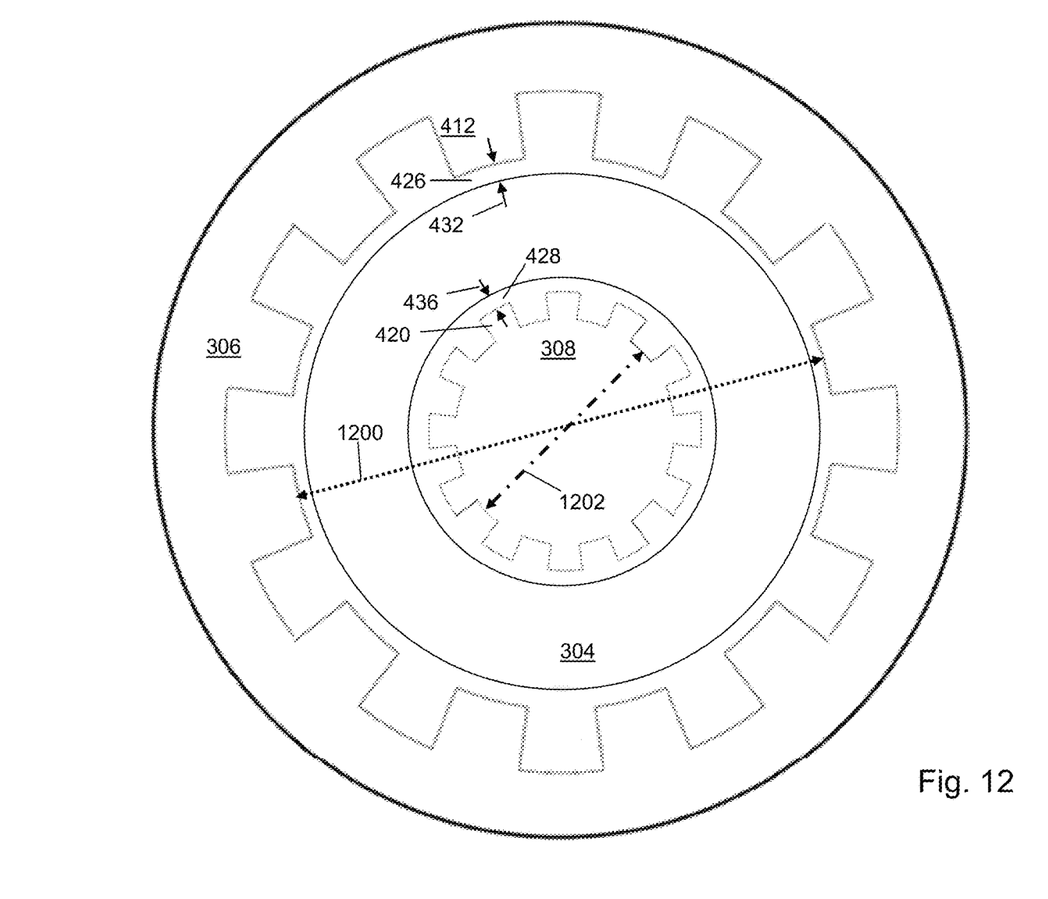
FIG. 12 shows a double air gap permanent magnet vernier machine with a first stator and a second stator positioned radially on either side of a rotor in accordance with an illustrative embodiment.

Referring to FIG. 5, depicts a portion of a double air gap permanent magnet vernier machine with a first stator and a second stator positioned radially on either side of a rotor. Though FIG. 5 shows a radial arrangement as opposed to the axial arrangement of FIG. 3, a common set of reference numbers is used. Referring also to FIG. 12, first stator 306 is mounted on a first side of rotor 304 separated by first air gap 426, and second stator 308 is mounted on a second side of rotor 304 separated by second air gap 428. First air gap 426 has a first height 432 between a surface of rotor 304 and a surface of a tooth of the first plurality of teeth 412. Second air gap 428 has a first height 436 between a surface of rotor 304 and a surface of a tooth of the second plurality of teeth 420. A first air gap diameter 1200 of first stator 306 and a second air gap diameter 1202 of second stator 308 are also shown in FIG. 12. Referring again to FIG. 5, a first winding associated with first stator 306 has a first portion 500 positioned in a first slot 502 of the first plurality of slots 410, and a second portion 504 positioned in a second slot 506 of the first plurality of slots 410. A second winding associated with second stator 308 has a first portion 508 positioned in a first slot 510 of the second plurality of slots 418, and a second portion 512 positioned in a second slot 514 of the second plurality of slots 418. Additional windings (not shown) are similarly mounted in the first plurality of slots 410 of first stator 306 and the second plurality of slots 418 of second stator 308 as understood by a person of skill in the art. The windings are wound about first stator 306 to form a number of poles between a first set of terminals 600 shown referring to FIG. 6. The windings are wound about second stator 308 to form a number of poles between a second set of terminals 602 shown referring to FIG. 6. In an illustrative embodiment, the windings are full pitched.

Figure 6:
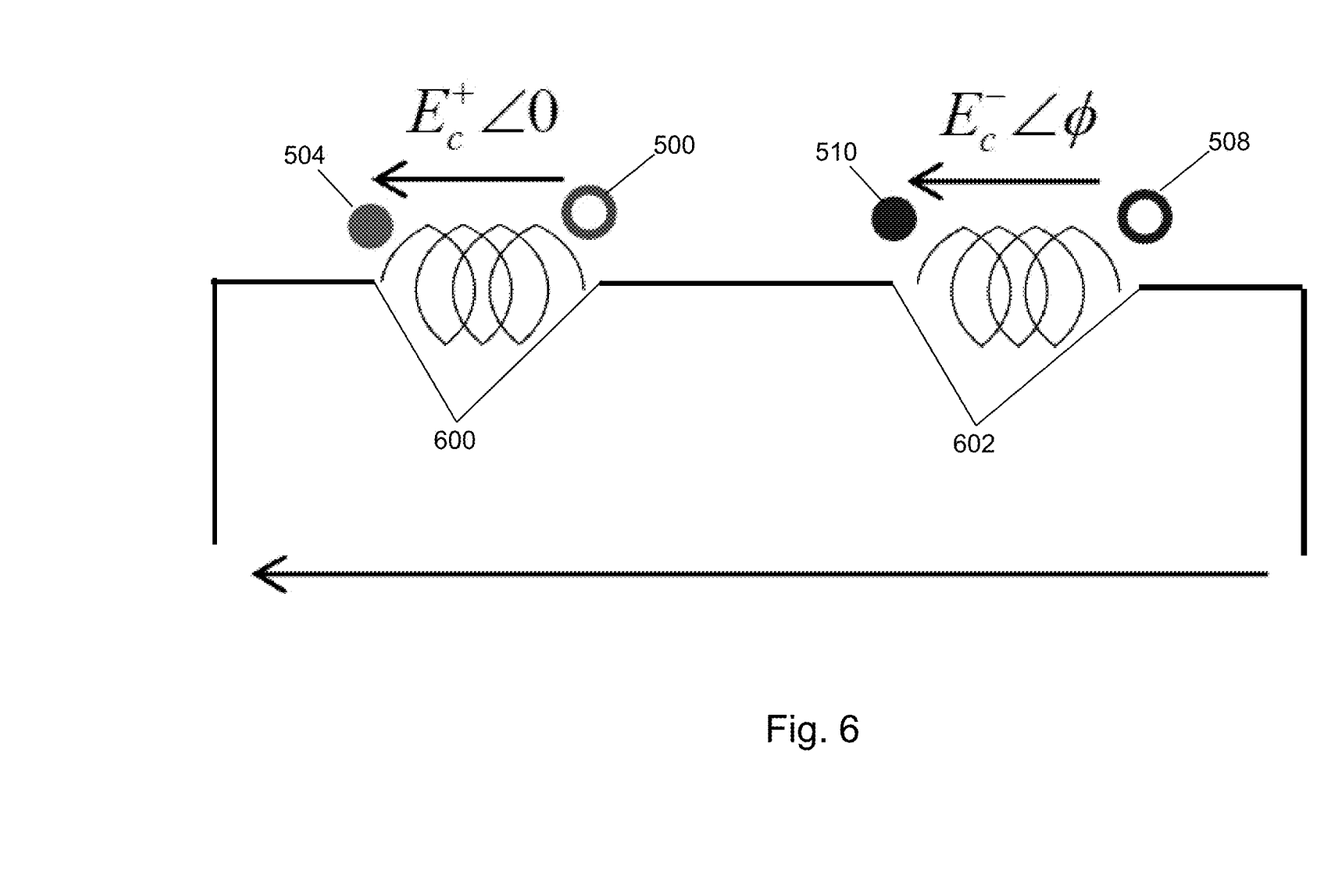
FIG. 6 depicts a current flow through the windings illustrated in FIG. 5 in accordance with an illustrative embodiment.

Referring to FIG. 6, a current flow is illustrated between the first and the second windings mounted in series for illustration. The phase difference between the back-EMF of the first windings of first stator 306 and the second windings of second stator 308 is $$\frac{\pi}{6q}$$

radians. Therefore, the first and the second windings can be connected in series as illustrated in FIG. 6.

Again, the number of the first plurality of slots 410 and of the second plurality of slots 418, $Z_s$, equal 6pq for first stator 306 and second stator 308, and $Z_r - Z_s = -p$.

If $c_0 = 0.5$, each tooth of the first plurality of teeth 412 aligns with a slot of the second plurality of slots 418, and each tooth of the second plurality of teeth 420 aligns with a slot of the first plurality of slots 410 so that the net air gap permeance with respect to rotor 304 can be shown to be $P_g(\theta) = 2P_0$.

The back-emf for a radial arrangement of first stator 306, rotor 304, and second stator 308 can be defined as $$E_c^+ = \frac{4}{\pi\sqrt{2}} l_{stk} \omega_m \gamma_{rg} k_w N_{ph}^+ \frac{B_r}{\mu_r} \Lambda_R \Lambda_S^{ver} L 0$$

$$E_c^- = \frac{4}{\pi\sqrt{2}} l_{stk} \omega_m \gamma_{rg} k_w N_{ph}^- \frac{B_r}{\mu_r} \Lambda_R \Lambda_S^{ver} L \frac{\pi}{6q}$$

Where $E_c^+$ is the back-emf for first stator 306, $E_c^-$ is the back-emf for second stator 308, $$\gamma_{rg} = \frac{r}{g} = \frac{r_i}{g_i} = \frac{r_o}{g_o},$$

$\Lambda_S^{ver} = 2 + (6.24q - 2.64)\beta$, $\beta_r$ is the nonlinear function of $$\frac{g_m}{g},$$

$r_i$ is inner radius for radially mounted stator, $r_0$ is outer radius for radially mounted stators, $$k_r = \frac{r_o}{r_i}, \quad k_{cm} = \sin\left((1 - c_{0r})\frac{\pi}{2}\right),$$

$c_{0r}$ is the ratio of magnet thickness to rotor one pole pitch, and $$\Lambda_R = \frac{k_{cm} r_i (k_r - 1)\left(1 + \left(\frac{1 \sin(1.6\pi c_{0r})}{\pi 1 - (1.6 c_{0r})^2} - 1.6 c_{0r}\right)\beta_r\right)}{\frac{2Z_r}{\pi c_{0r}} \ln(k_r) + \frac{\pi \gamma_{rg}}{\mu_r Z_r}(1 - 1.6 \beta_r c_{0r})(1 - 0.8 \beta_s)}$$

for radially mounted stators, and $$\Lambda_r = \frac{k_{cm} h_m \left(1 + \left(\frac{1 \sin(1.6\pi c_{0r})}{\pi 1 - (1.6 c_{0r})^2} - 1.6 c_{0r}\right)\beta_r\right)}{\frac{\pi \gamma_{rg}}{\mu_r Z_r}(1 - 1.6 \beta_r c_{0r})(1 - 0.8 \beta_s)}$$

for axially mounted stators.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A vernier machine comprising:
   a rotor;
   a plurality of permanent magnets mounted as spokes in pole pairs within the rotor;
   a first stator comprising a first plurality of slots and a first plurality of teeth, wherein a slot of the first plurality of slots is positioned between a pair of the first plurality of teeth, and further wherein the first stator is mounted on a first side of the rotor separated by a first air gap between the rotor and a tooth of the first plurality of teeth;
   a second stator comprising a second plurality of slots and a second plurality of teeth, wherein a slot of the second plurality of slots is positioned between a pair of the second plurality of teeth, and further wherein the second stator is mounted on a second side of the rotor separated by a second air gap between the rotor and a tooth of the second plurality of teeth, wherein the second side is opposite the first side;
   a first stator winding wound about the first stator to form a total number of poles between a first set of terminals; and
   a second stator winding wound about the second stator to form the total number of poles between a second set of terminals;
   wherein the first plurality of teeth is offset from the second plurality of teeth by a half slot pitch relative to the rotor;
   wherein a number of the pole pairs of the rotor is greater than the total number of poles of the first stator winding.

2. The vernier machine of claim 1, wherein the first stator, the second stator, and the rotor are positioned axially adjacent to each other.

3. The vernier machine of claim 2, wherein a height of the first air gap is equal to a height of the second air gap.

4. The vernier machine of claim 1, wherein the first stator, the second stator, and the rotor are positioned radially adjacent to each other.

5. The vernier machine of claim 4, wherein a ratio of a height of the first air gap to a height of the second air gap is equal to a ratio of a diameter of the first air gap to a diameter of the second air gap.

6. The vernier machine of claim 1, wherein a number of the first plurality of slots equals a number of the second plurality of slots.

7. The vernier machine of claim 6, wherein a number of the first plurality of teeth equals a number of the second plurality of teeth.

8. The vernier machine of claim 1, wherein a number of the first plurality of slots, $Z_s$, equals 6pq where p is the total number of poles of the first stator winding and q is a number of the first plurality of slots per the number of poles of the first stator winding per a number of phases provided by an alternating current when supplied to the first stator winding.

9. The vernier machine of claim 8, wherein the number of the pole pairs of the rotor is $Z_s$–p.

10. The vernier machine of claim 8, wherein q is less than three.

11. The vernier machine of claim 1, wherein a number of the second plurality of slots, $Z_s$, equals 6pq where p is the total number of poles of the second stator winding and q is a number of the second plurality of slots per the number of poles of the second stator winding per a number of phases provided by an alternating current when supplied to the second stator winding.

12. The vernier machine of claim 1, wherein the first stator winding and the second stator winding are connected in series.

13. The vernier machine of claim 1, wherein the first stator winding and the second stator winding are wound full pitched.

14. The vernier machine of claim 1, wherein the slot pitch is defined as $$\frac{W_s}{W_s + W_T},$$

where $W_s$ is a slot want between a pair of teeth of the first plurality of teeth and of the second plurality of teeth and $W_T$ is a tooth width of the first plurality of teeth and of the second plurality of teeth.

* * * * *

UNITED STATES PATENT AND TRADEMARK OFFICE
CERTIFICATE OF CORRECTION

PATENT NO. : 9,595,858 B2  
APPLICATION NO. : 14/021543  
DATED : March 14, 2017  
INVENTOR(S) : Lipo et al.

Page 1 of 1

It is certified that error appears in the above-identified patent and that said Letters Patent is hereby corrected as shown below:

In the Specification

Column 3, Line 66:
Delete "$Z_{r-s} = \pm p$" and replace with --$Z_r - Z_s = \pm p$--

Column 9, Line 60:
Delete "$\Lambda_r = \dfrac{k_{cm}r_i(k_r-1)(1+(\frac{1}{\pi}\frac{\sin(1.6\pi c_{0r})}{1-(1.6c_{0r})^2}-1.6c_{0r})\beta_r}{\frac{2Z_r}{\pi c_{0r}}\ln(k_r)+\frac{\pi\gamma r_g}{\mu_r Z_r}(1-1.6\beta_r c_{0r})(1-0.8\beta_s)}$ ,, and replace with --$\Lambda_R = \dfrac{k_{cm}r_i(k_r-1)(1+(\frac{1}{\pi}\frac{\sin(1.6\pi c_{0r})}{1-(1.6c_{0r})^2}-1.6c_{0r})\beta_r}{\frac{2Z_r}{\pi c_{0r}}\ln(k_r)+\frac{\pi\gamma r_g}{\mu_r Z_r}(1-1.6\beta_r c_{0r})(1-0.8\beta_s)}$ --

In the Claims

Claim 14, Column 12, Line 17:
Delete "slot want between" and replace with --slot width between--

Signed and Sealed this  
Sixteenth Day of May, 2017

Michelle K. Lee  
*Director of the United States Patent and Trademark Office*